(12) United States Patent
Termanini

(10) Patent No.: US 12,457,500 B2
(45) Date of Patent: Oct. 28, 2025

(54) MULTIFACTOR AUTHENTICATION USING THREE-DIMENSIONAL DATA OBJECTS FOR CONFIGURABLE WORKSPACES

(71) Applicant: CRESTRON ELECTRONICS, INC., Rockleigh, NJ (US)

(72) Inventor: Samir Termanini, Little falls, NJ (US)

(73) Assignee: CRESTRON ELECTRONICS, INC., Rockleigh, NJ (US)

( * ) Notice: Subject to any disclaimer, the term of this patent is extended or adjusted under 35 U.S.C. 154(b) by 213 days.

(21) Appl. No.: 17/891,326

(22) Filed: Aug. 19, 2022

(65) Prior Publication Data
US 2022/0408269 A1     Dec. 22, 2022

(51) Int. Cl.
H04W 12/77     (2021.01)
H04L 9/40      (2022.01)
H04W 12/06     (2021.01)

(52) U.S. Cl.
CPC ......... *H04W 12/77* (2021.01); *H04L 63/0853* (2013.01); *H04W 12/06* (2013.01)

(58) Field of Classification Search
CPC .. H04W 12/77; H04W 12/06; H04L 63/0853; H04L 63/0807
See application file for complete search history.

(56) References Cited

U.S. PATENT DOCUMENTS

| 9,740,974 B2 | 8/2017 | Kumar et al. |
| 9,829,578 B2 | 11/2017 | Chaudhry et al. |
| 9,864,940 B2 | 1/2018 | Flores et al. |
| 2011/0064312 A1 | 3/2011 | Janky et al. |
| 2012/0181329 A1 | 7/2012 | Gratton et al. |

(Continued)

OTHER PUBLICATIONS

U.S. Appl. No. 10/789,463, filed Sep. 29, 2020, Kutter et al.

(Continued)

*Primary Examiner* — Vu V Tran

(57) ABSTRACT

In some implementations, the device may include a mobile user device having a first side and a second side, the mobile user device having a first wireless communication interface communicatively coupled to a cloud network, an optical imaging camera positioned on the first side of said mobile user device, a first LIDAR camera disposed on the first side, and a display screen disposed on said second side of said mobile user device. In addition, the device may include a conferencing device having an outer enclosure, the conferencing device including a display screen housed withing said outer enclosure, a bezel cover that forms a part of the outer enclosure and covers said display screen, where said bezel cover includes an electrochromatic region that is transparent when electrically energized and said electrochromatic region is opaque when de-energized. The device may include a three-dimensional object encoded with a symbology for representing data in the x-direction, y-direction, and z-direction, said three-dimensional object disposed behind said electrochromatic region of said bezel cover and inside the interior of said enclosure. Moreover, the device may include a remote cloud server having a network interface communicatively coupled to said remote cloud server, the remote cloud server having CPU and a nonvolatile storage.

8 Claims, 8 Drawing Sheets

(56) References Cited

U.S. PATENT DOCUMENTS

| | | | |
|---|---|---|---|
| 2014/0313282 A1* | 10/2014 | Ma | H04N 7/141 |
| | | | 348/14.09 |
| 2016/0082897 A1 | 3/2016 | Mouser et al. | |
| 2016/0277439 A1* | 9/2016 | Rotter | H04L 63/0861 |
| 2016/0307083 A1 | 10/2016 | Kumar et al. | |
| 2018/0065483 A1* | 3/2018 | Liburdi | B60K 35/60 |
| 2019/0026121 A1* | 1/2019 | Wang | H04L 67/141 |
| 2019/0044723 A1 | 2/2019 | Prakash et al. | |
| 2019/0108396 A1 | 4/2019 | Dal Mutto et al. | |
| 2021/0258308 A1* | 8/2021 | Avetisov | H04L 9/3215 |
| 2021/0274148 A1 | 9/2021 | Pacala et al. | |
| 2021/0334538 A1 | 10/2021 | Marotta et al. | |
| 2021/0360311 A1* | 11/2021 | Richardson | H04L 63/0853 |

OTHER PUBLICATIONS

U.S. Appl. No. 10/906,247, filed Feb. 2, 2021, Flores et al.
U.S. Appl. No. 11/126,801, filed Sep. 21, 2021, Berger et al.
U.S. Appl. No. 11/151,235, filed Oct. 19, 2021, Prakash et al.
U.S. Appl. No. 11/313,677, filed Apr. 26, 2022, Metzler et al.

* cited by examiner

MULTIFACTOR AUTHENTICATION USING THREE-DIMENSIONAL DATA OBJECTS FOR CONFIGURABLE WORKSPACES

BACKGROUND OF THE INVENTION

Technical Field

The present disclosure relates generally to electronic security, and more specifically, to the use of a mobile user device for authenticating and verifying a user's actual presence at a workspace at check-in and applying a predetermined profile for the configuration of hardware resources available to the workspace.

Description of the Related Art

Organizations are increasingly adopting some form of hybrid hoteling model for its workforce in which workers dynamically schedule their use of onsite rooms. Centralized scheduling of these onsite rooms has traditionally been accomplished using an electronic reservation system having a calendar-based scheduling server to upload and/or download one or more aspects of availability data associated with a room. An electronic reservation system might be used to reserve an office or conference room, with the result being that others can access the reservation system to ascertain whether the room might be available for their own use.

Participants in an organization, that dynamically schedules onsite rooms, may interact with a reservation system using a scheduling device. For example, each room may have a dedicated scheduling device. Examples include scheduling touchscreens offered by Crestron Electronics, Inc. Of Rockleigh, N.J. Touchscreens can be installed outside of a room which can be programed to allow users to view the room availability, check the status of nearby rooms, and/or reserve a room for an ad hoc meeting simply by interacting the touch screen. Interacting with a reservation system can also be accomplished using a mobile user device (e.g., a mobile smartphone) running an approved software application.

Barcodes have become a known and widely accepted method for storing information. Their most popular use includes determining the price of an item at retail check-out counters. Other uses may also include, item identification, detailed part information, serial number information, and inventory information. Commonly encountered barcodes are usually either one-dimensional or two-dimensional and are typically printed directly on an object's surface or on labels affixed to an object's surface. Barcodes are typically read by optical scanning techniques using countertop scanners, handheld wands, or mobile phone cameras. One-dimensional Barcodes typically comprise bars and spaces with bars of varying widths representing strings of binary ones and spaces of varying widths representing binary zeros. An example of a one-dimensional barcode 101 is shown in FIG. 1.

Two-dimensional barcodes have also become a known and widely accepted method for storing information. An example of a two-dimensional barcode is the data matrix code, which consists of black and white "cells" or dots arranged in either a square or rectangular pattern. One example of a two-dimensional barcode is the Quick Response code (QR-code.) A QR-code consists of black squares arranged in a square grid on a white background. Information such as a street address, telephone number, or web browser URL, for example, may be stored in a quick response (QR) code. A QR code may be readable by mobile phones with a camera, smart phones, computing devices, specialized scanners, and so on. The information encoded within the matrix barcode may be text, uniform resource indicator (URI), alphanumeric, numeric, and other data. Users with a camera phone or other mobile user device equipped with the correct reader application can convert a photographic image of the matrix barcode to display text, contact information, connect to a wireless network, open a webpage in the phone's browser, and so on.

Three-dimensional imagers, ubiquitously available on consumer-grade mobile user devices, sometimes known as light detection and ranging (LiDAR) sensors, can be used to capture point depth information of objects or an area by illumination with an optical beam and by analyzing the reflected optical beam. A commonly used technique to determine the distance to each point on the target involves projecting an optical beam towards the target, followed by the measurement of the round-trip time, i.e. Time-of-flight (ToF), taken by the optical beam as it travels from the source to target and back to a detector adjacent to the source. Based on the time elapsed between emission of the pulse of light and detection of the returned pulse of light, a distance is estimated. LiDAR can be used to scan a 3D surface of objects and distinguish it from other objects.

While biometric authentication may be advantageous because it allows a user to authenticate more securely and quickly than, for example, entering a password or some other credential, the same level of biometric security does not currently exist for authenticating a hardware device.

The information included in this Background section of the specification, including any references cited herein and any description or discussion thereof, is included for technical reference purposes only and is not to be regarded subject matter by which the scope of the invention as defined in the claims is to be bound.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one general aspect, workspace management system may include a mobile user device having a first side and a second side, the mobile user device having a first wireless communication interface communicatively coupled to a cloud network, an optical imaging camera positioned on the first side of said mobile user device, a first LIDAR camera disposed on the first side, and a display screen disposed on said second side of said mobile user device. A Workspace management system may also include a conferencing device having an outer enclosure, the conferencing device including a display screen housed withing said outer enclosure, a bezel cover that forms a part of the outer enclosure and covers said display screen, where said bezel cover includes an electrochromatic region that is transparent when electrically energized and said electrochromatic region is opaque when de-energized.

A workspace management system may furthermore include a three-dimensional object encoded with a symbology for representing data in the x-direction, y-direction, and z-direction, said three-dimensional object disposed behind said electrochromatic region of said bezel cover and inside the interior of said enclosure. The system may include a remote cloud server having a network interface communicatively coupled to said remote cloud server, the remote cloud server having CPU and a nonvolatile storage. Other embodiments of this aspect include corresponding computer systems, apparatus, and computer programs recorded on one or more computer storage devices, each configured to perform the actions of the methods.

Implementations may include one or more of the following features. A workspace management system where said nonvolatile storage tangibly embodies instructions executable by said central processing unit for generating an authentication token to be shown on the display screen portion of said conferencing device, encoding said authentication token in a QR-Code for display on said display screen, transmitting said authentication token to said conferencing device, authenticating said authentication token after it is received from said mobile user device, transmitting instructions to said bezel cover of said conferencing device to energize said electrochromatic region, and authenticating information received from said mobile user device containing data from a capture by said first LIDAR camera of said three-dimensional object. Workspace management system where said QR-Code is encoded with a tokenized URL that points to a link for downloading an application on to said mobile user device. A workspace management system where said a bezel cover is transparent to the frequency of the light used by said first LIDAR camera. A workspace management system where said network interface includes the capability to connect directly to a cellular data network. Workspace management system where said conferencing device is located withing a workspace, said workspace having: a Control System Processor; one or more electronic devices; a local area network for communication between the one or more electronic devices, the control processor, and conferencing device. Workspace management system where said Control System Processor provides a web interface for said remote cloud server to be displayed on said conferencing device. A workspace management system where said remote cloud server further may include includes a workspace automation application having an event scheduling engine configured to allow an user to preprogram user profiles, presents, scenes, building rules, and schedule of event of said electronic devices the workspace; and a network switch communicatively connected to a cloud network and said local area. A workspace management system where said remote cloud server further may include a control engine configured to send at least one command to control the electronic devices, said command being one of a command to power on/off or dim a lighting device, control a touch panel, raise a shades, lower a shade, adjust the temperature setpoint of an HVAC system, disable a security system, and toggle the power of a sensor. Implementations of the described techniques may include hardware, a method or process, or a computer tangible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE SEVERAL VIEWS OF THE DRAWINGS

The drawing figures depict one or more implementations in accord with the present teachings, by way of example only, not by way of limitation. In the figures, like reference numerals refer to the same or similar elements. Furthermore, the drawings are not necessarily to scale.

Figure 1:
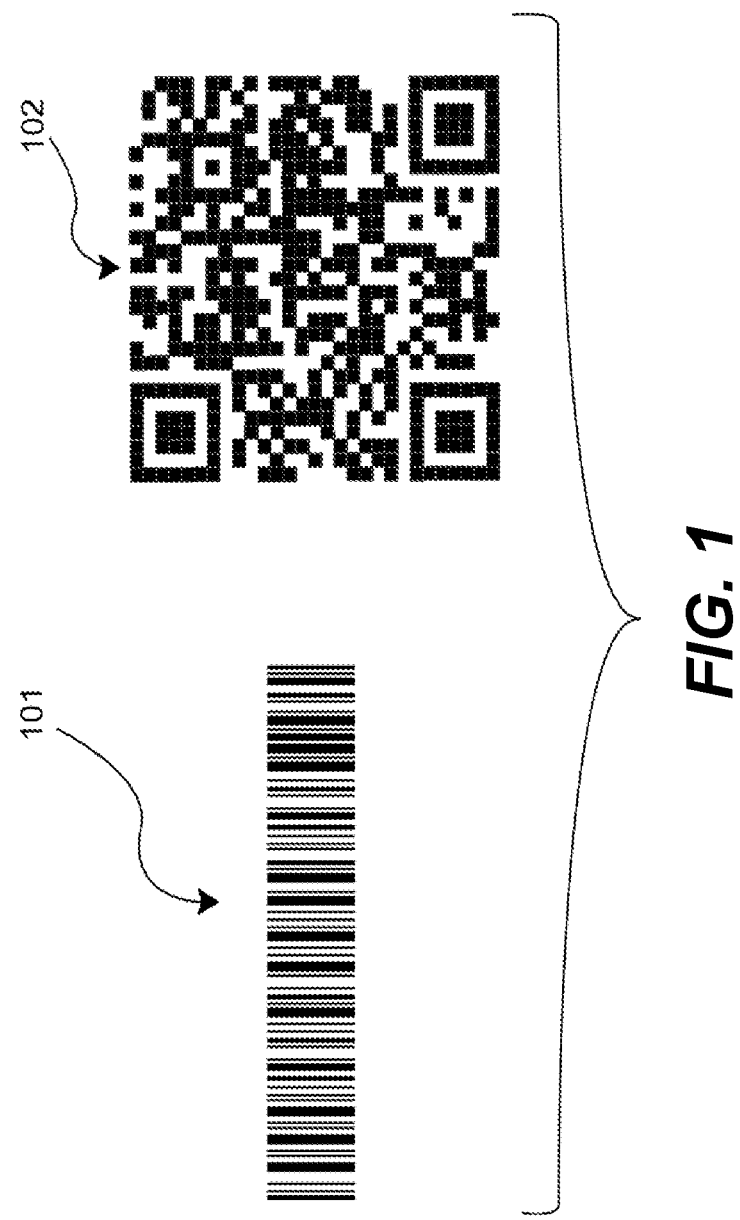
FIG. 1 depicts examples of a one-dimensional and a two-dimensional barcode.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different elements may be described or claimed as "configured" to perform one or more tasks or operations. This formulation is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some tasks refers to something physical, such as a device, circuit, memory storing program instructions executable to implement the task, etc. This phrase is not used herein to refer to something intangible. Thus, the "configured to" construct is not used herein to refer to a software entity such as an application programming interface (API). The term "configured to" is not intended to mean "configurable to." An unprogrammed FPGA, for example, would not be considered to be "configured to" perform some specific function, although it may be "configurable to" perform that function and may be "configured to" perform the function after programming.

As used herein, the terms "first," "second," etc. Are used as labels for nouns that they precede, and do not imply any type of ordering (e.g., spatial, temporal, logical, etc.) unless specifically stated. For example, a mobile user device may have a first user and a second user. The term "first" is not limited to the initial user of the device. The term "first" may also be used when only one user of the mobile user device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION OF THE INVENTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The terms "LIDAR camera," "3D scanner," and "3D camera" refer to a device or system that is capable of performing scanning data that is encoded in a 3D object (e.g. 3D QR Code). A 3D camera will include a processor and one or more sensors that can sense and range-find the physical attributes of the objects. Several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to LIDAR and determining ranges (variable distance) by targeting an object or a surface with a laser and measuring the time for the reflected light to return to the receiver, however, other techniques may be used. For example, an image sensor (camera), sonic sensor (e.g., sonar), a magnetic sensor, an x-ray device, a combination of an infrared camera with an infrared light source, an air-knife type of reader, or other sensors. The processor will implement programming instructions, typically using parameters from a data file that cause the sensor to collect data that is embedded in a 3D barcode. As used throughout this disclosure, the terms "three-dimensional scanner," "3D scanning device," "3D scanning system," and "3D scanner" refer to any now or hereafter known 3D scanning camera.

Embodiments of the workspace management system can be used in small, mid, or large scale residential or commercial installations. While the embodiments are described herein as being implemented for in use with buildings having one or more shared workspaces, they are not limited to such an implementation. The present embodiments may be employed in other type of venues or facilities, including in residential, retail, or non-profit structures or venues. Additionally, while the workspace management system described herein as managing and controlling an entire building, it may be scaled up to manage a collection of buildings or scaled down to manage a single workspace within a building. Workspace systems can be implemented as one or more dedicated servers which provide convenient control and monitoring of various mechanical and electrical equipment within a building. Workspace systems can utilize a network of sensors and associated controllers located throughout a building to monitor and control the mechanical and electrical equipment in the building. Examples include heating, ventilation, and air conditioning, lighting, shading, security, appliances, door locks, and audiovisual (AV) equipment in each workspace.

The following are definitions of exemplary terms used throughout the disclosure. Both singular and plural forms of all terms fall within each meaning:

"Mobile Application" or "Mobile App" or "App" as used herein, includes, but is not limited to, applications that run on smart phones, tablet computers, and other mobile user devices. The terms "Mobile Application" or "Mobile App" or "App" can be used synonymously with "software". Mobile applications allow users to connect to services, access the internet, intranet, cellular, or wireless fidelity (Wi-Fi) networks, to access, retrieve, transmit and share data.

"Computer" or "processing unit" as used herein includes, but is not limited to, any programmed or programmable electronic device, microprocessor, logic circuit, that can store, retrieve, and process data.

The term "Network" as used herein refers to a collection of hardware components and computers or machines interconnected by one or more communication channels that allow sharing of resources, data, and information, including without limitation, the worldwide web or internet. A network can be "wireless" or wired or a combination of a wireless and/or wired communication.

A "Web browser" as used herein, includes, but is not limited to, a software for retrieving and presenting information resources on the World Wide Web. An information resource may be a web page, an image, a video, or any other type of electronic content.

A "Server" as used herein, includes, but is not limited to, a computer or a machine or a device on a network that manages network resources. A "server" may refer one or more server computers configured to provide certain server functionalities, such as database management and search engines. A server may also include one or more processors to execute computer programs in parallel. The general term "Server" may include specific types of servers, such as a File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

Figure 2:
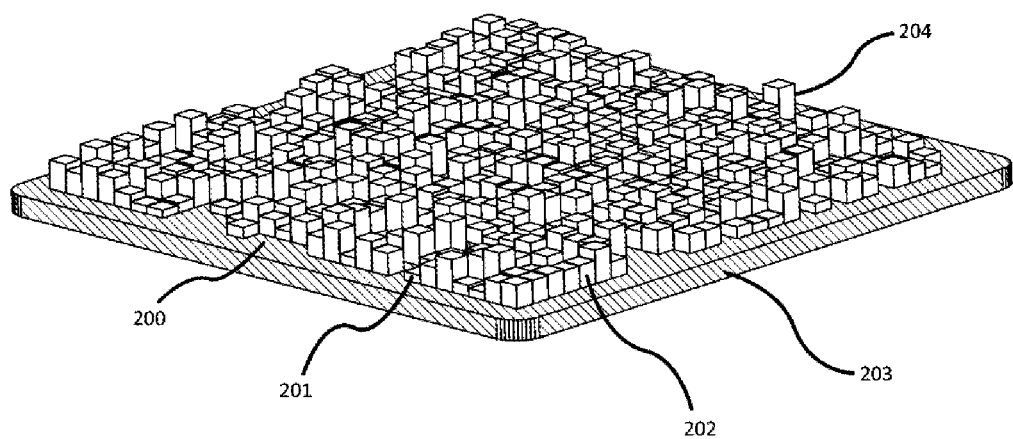
FIG. 2 illustrates a three-dimensional object encoded with a symbology for representing data, according to an embodiment.

Referring to FIG. 2, a three-dimensional object encoded with a symbology for representing data has base 203 having a plurality of cuboids of varying heights 201, 202, and 204 disposed thereon. The cuboids are arranged to cover each black square of a 2D QR-Code, however as described below, additional symbology is encoded in the height of each cuboid.

Figure 3:
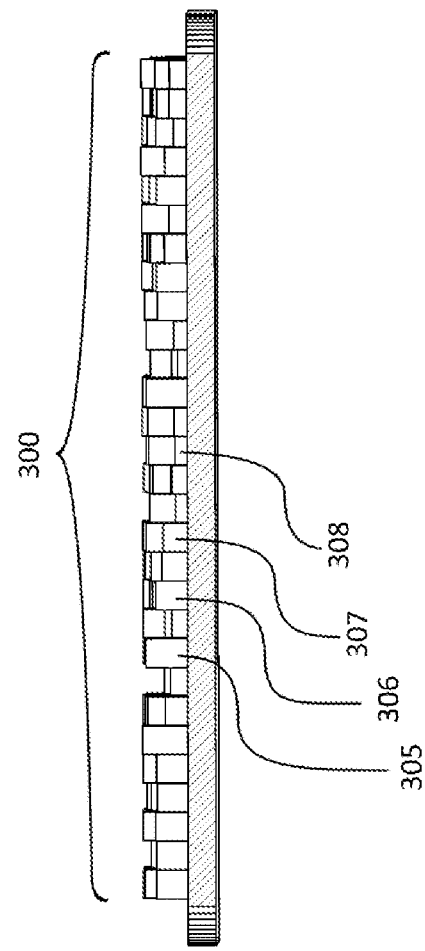
FIG. 3 illustrates a three-dimensional object encoded with four distinct symbols representing values one to four, according to an embodiment.
Figure 3:
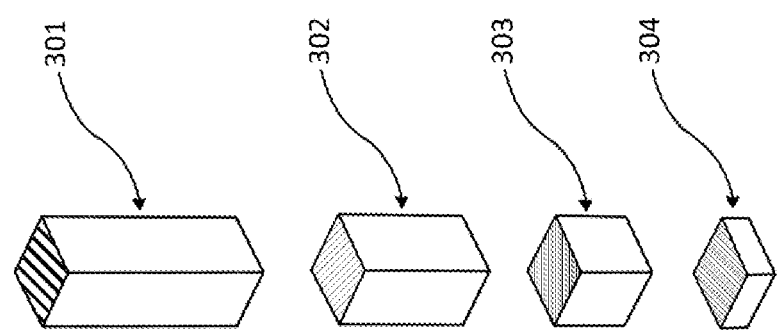

FIG. 3 illustrates a three-dimensional object encoded with four distinct symbols. By varying a cubiod's height additional information can be encoded in to the object when captured, for example, using a 3D LIDAR camera. In one embodiment, Cuboid 304 height represents a value of one, cuboid 303 height represents a value of two, cuboid 302 height represents a value of three, and cuboid 304 height represents a value of four. Cuboids 305-308 illustrate cuboids 301-304, respectively, when used together in collection 300.

Figure 4:
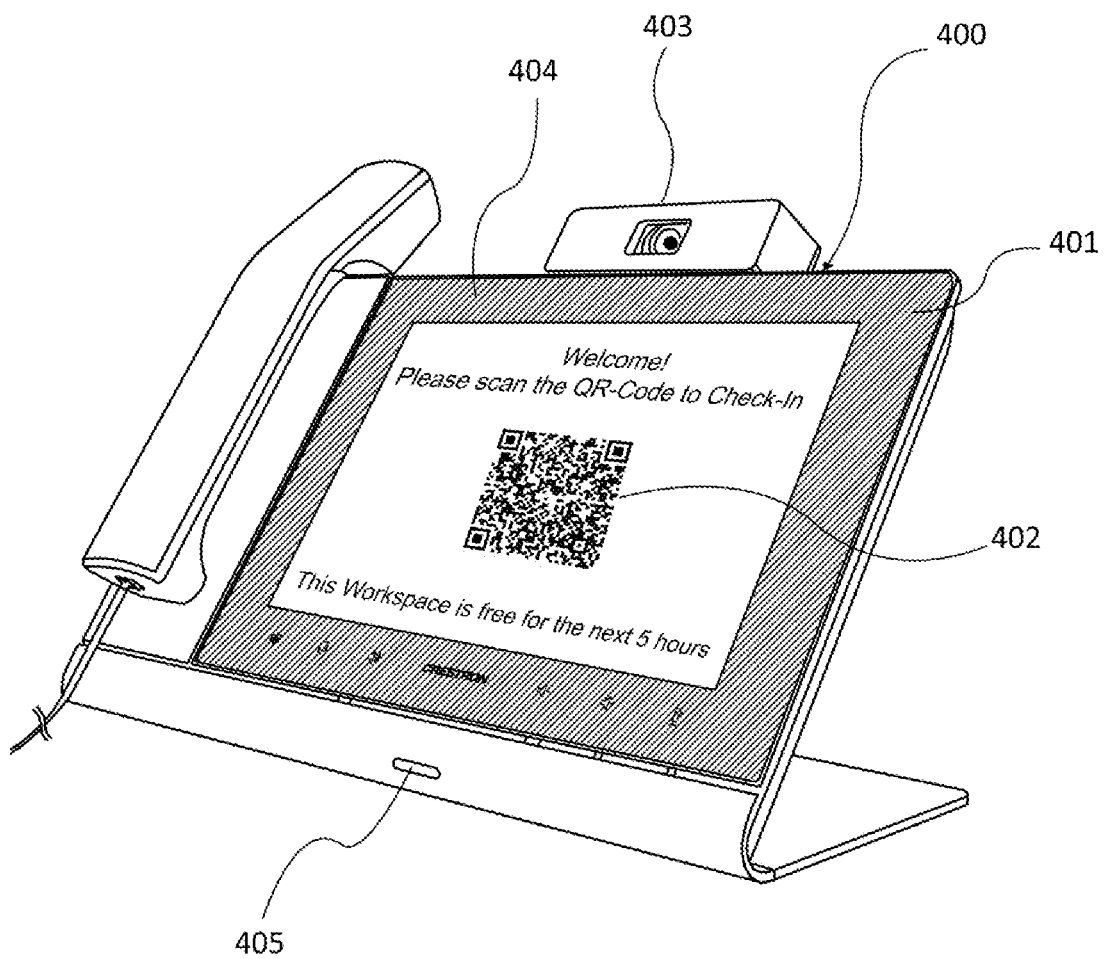
FIG. 4 illustrates a conferencing device, according to an embodiment.

FIG. 4 illustrates an example of conferencing device 400. In this embodiment the conferencing device 400 is a Crestron Flex Phone available from Crestron Electronics, Inc. Of Rockleigh, N.J. In this embodiment, conferencing device 400 has video camera 403, available from Crestron Electronics, Inc. Of Rockleigh, N.J. Microphone 405 may be an Integrated high-fidelity array microphone or a Omnidirectional microphone array with 360-degree audio pickup, display screen 404 that may be a 10" high resolution touch screen, and bezel 404. In an embodiment, Conferencing device 400 may include an embedded occupancy for capturing meeting-space data and usage analytic, be powered over ethernet as an IEEE 802.3af Class 3 and 802.3 at Class 4 PoE powered device, include a USB-C for an audio headset, and include a 1000Base-T Ethernet port & PoE PD port for connection to a LAN with PoE PSE. Display screen 404 may present QR-Code 402.

In the embodiments described below, a QR-Code 402 may be used to encode location information, for example, workspace location, while in other embodiments, QR-Code 402 may encode information other than location information. For example, the QR-code may encode a URL or IP address that is associated with a remote cloud server. In other embodiments, the QR-code may encode a binary string that is associated with an authentication token for the conferencing device. In the instance where the QR-code encoding further comprises a security token and that token is sent by a mobile user device by the remote cloud server, additional authentication steps my commence. That is, upon remote cloud server receiving the token from a mobile user device, the remote cloud server can proceed with an additional sequence of authentication workflow.

Figure 5:
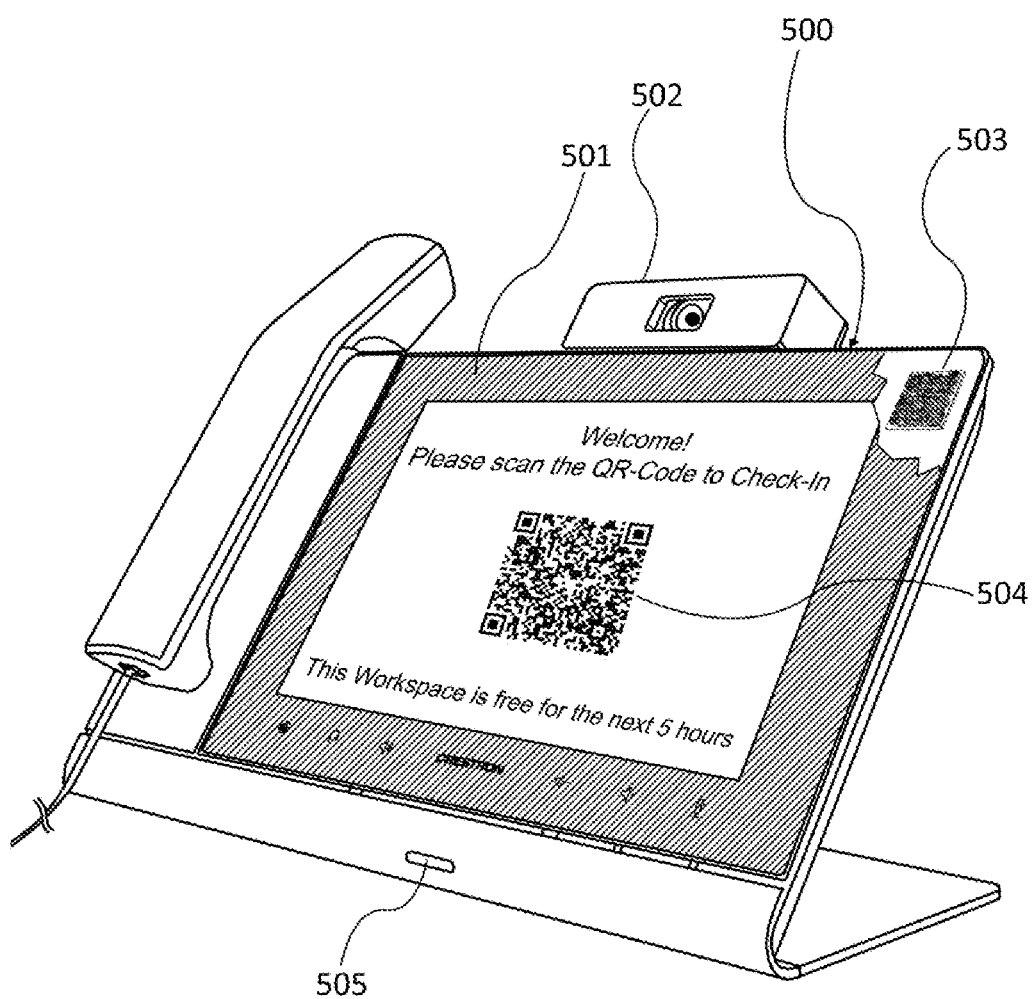
FIG. 5 illustrates a conferencing device with a portion of its bezel cover cutaway to reveal a three-dimensional object used for authentication, according to an embodiment.

FIG. 5 illustrates a modified conferencing device shown in FIG. 4 however, a portion of its bezel cover is cutaway to reveal a three-dimensional authentication object 503 that is encoded with additional information that can be used for an additional authentication workflow, according to an embodiment. Three-dimensional authentication object 503 is a LIDAR readable object disposed behind the bezel cover 501. In some implementations of the invention, bezel cover 501 may include various types of transparent glass, plastic, or similar transparent or semi-transparent materials that are transparent to frequencies associated with LIDAR, as disclosed in U.S. Pat. No. 9,829,578 B2 to Chaudhry, which incorporated herein by reference in its respective entirety.

Figure 6:
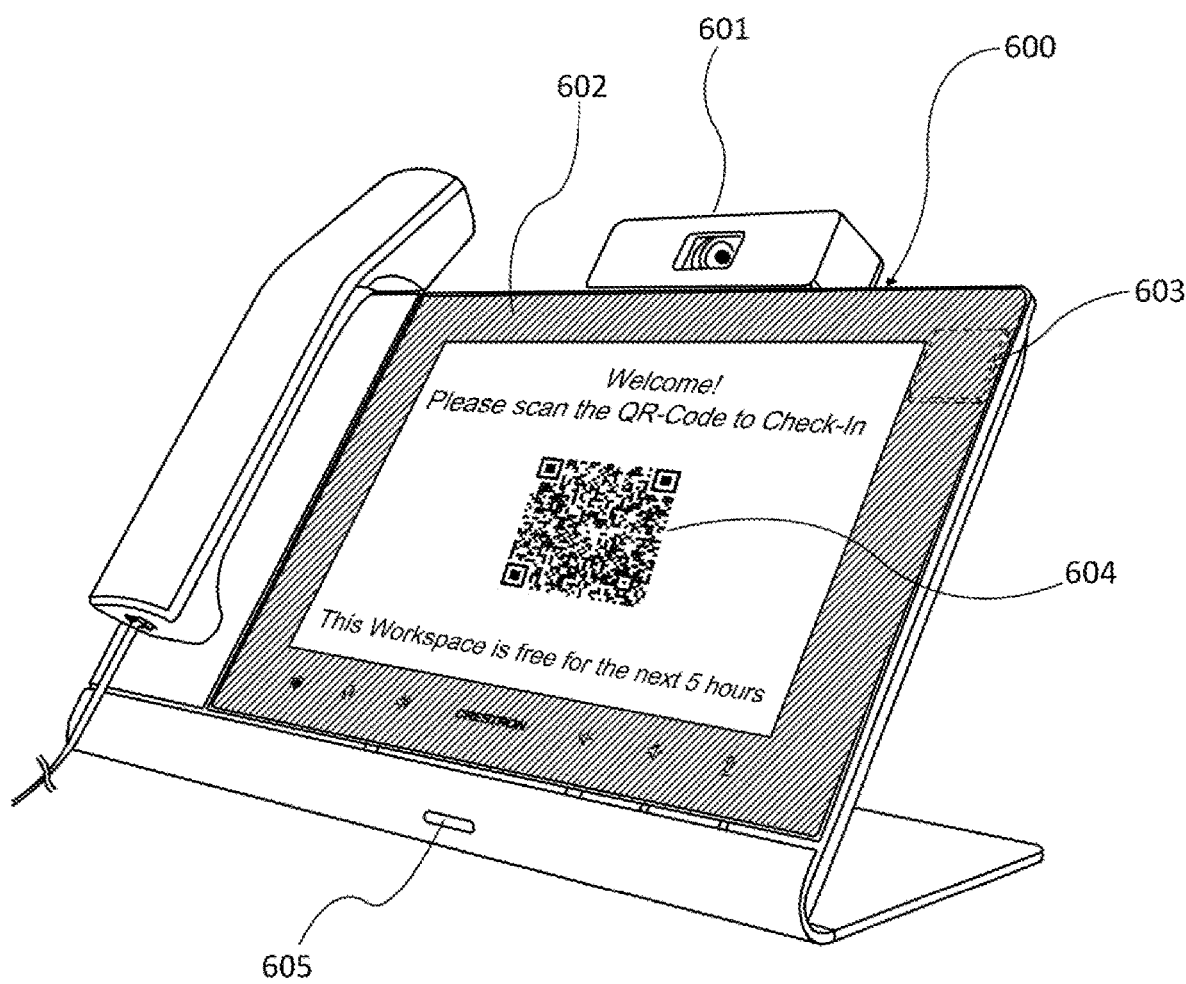
FIG. 6 illustrates a illustrates a conferencing device having a LIDAR readable three-dimensional object selectively concealed by an electrochromic bezel configured to varying its opacity, according to an embodiment.

FIG. 6 illustrates a illustrates a conferencing device having a LIDAR readable three-dimensional object 603 selectively concealed by bezel cover 602 configured to be electrochromic and vary its opacity. In one embodiment, all, or a portion of conference device 600 bezel cover 602 is designed to selectively conceal the LIDAR readable three-dimensional object 603 by varying its opacity using electrochromic, photochromic, thermochromic, suspended particle, micro-blind and/or a liquid crystal device. In these embodiments, the bezel cover has at least two modes. In the first mode ("visible mode") the bezel cover is substantially transparent and allows the frequencies used by the LIDAR camera's optical beam to therethrough. In the second mode (or "concealed mode") the bezel cover 602 is substantially opaque or substantially interferes with the ability of the LIDAR camera's optical beam to pass through. In an embodiment, the properties of electrochromatic or TN film used results in the bezel cover becoming opaque or dark when de-energized and transparent when energized. Similar suitable materials have been used as a window treatment for homes and commercial building for the control of sunlight and radiant energy.

An embodiment of the foregoing implementation, extends the bezel cover 602 configuration to include modes which concurrently affect the transmission and concealment of visible light (e.g., wavelengths in the range of 400-700 nanometers), thereby allowing the user interacting with the conferencing device 600 to see when they have been granted authorization to scan the hidden LIDAR readable three-dimensional object 603 disposed behind the bezel cover 602, because the inclusion of visible light allows the user to visually detect whether a transparent portion of bezel cover 602 is revealing a LIDAR readable three-dimensional object 603 or if, for example, the bezel cover 602 continues to remain opaque or dark.

In another embodiment, more than one uniquely encoded LIDAR readable three-dimensional object 603 disposed in different areas behind the bezel cover 602 and conferencing device 600 bezel cover 602 is configured to reveal only one of the LIDAR readable three-dimensional objects 603 according to a programed sequence for any authentication logic. In this way, different areas of the bezel cover 602 can be configured to act as independently-operable electrochromic shutters (arranged over several LIDAR readable three-dimensional objects 603) that selectively open and close at the appropriate time for any authentication process desired. The conferencing device 600 can alternatively include MEMS mechanical shutters or any other suitable type of shutter interposed between one or more LIDAR readable three-dimensional objects 603 and bezel cover 602.

In one embodiment, the conferencing device 600 selectively controls the bezel cover's opacity in order prevent the scanning of an adjacent LIDAR readable three-dimensional object (by blocking a LIDAR camera's ability to project a light beam on to its surface) until a user has completed a specific preliminary user check-in, or a basic authentication challenge. In some embodiments, a specific preliminary user check-in comprises having a user point their user communication device camera at a QR-Code 604 currently displayed on the display screen of the conferencing device. The QR-Code 604 is encoded with a tokenized URL that points to a link for downloading an application from the mobile user device's authorized App store. The tokenized URL downloads and installs the new application, uses the login credentials from the encoded information in order to complete a preliminary user check-in. A networked workspace scheduling server can generate, manage, store, and transmit tokenized URLs over a network to the conferencing device 600.

Figure 7:
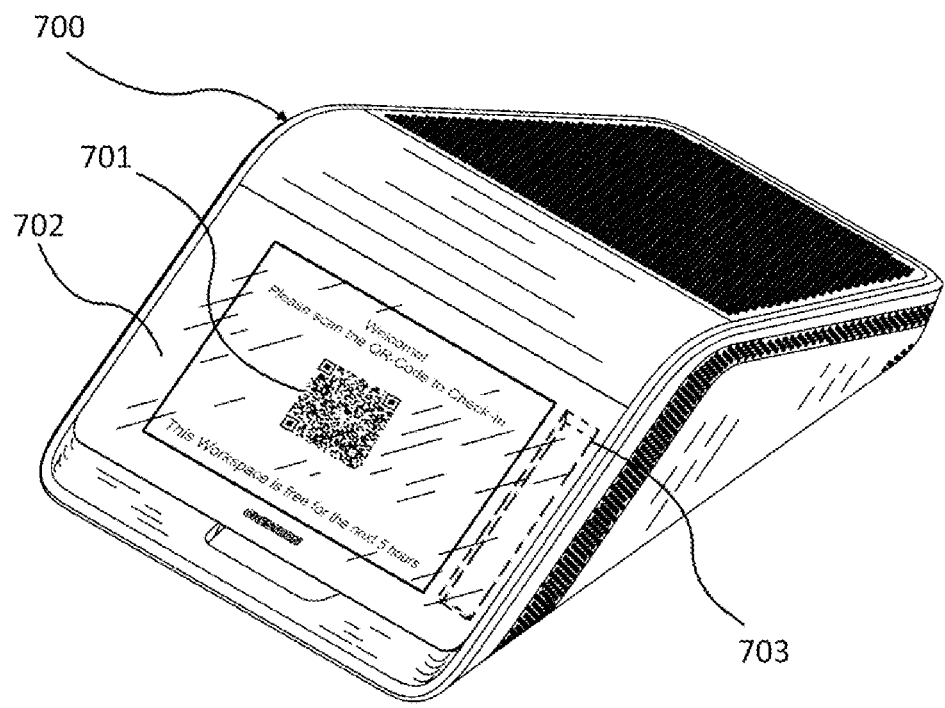
FIG. 7 illustrates a conferencing device having a LIDAR readable three-dimensional object selectively concealed by a electrochromic bezel configured to varying its opacity, according to another embodiment of the present disclosure.

FIG. 7 illustrates a conferencing device 700, and in this embodiment, the conferencing device 700 is a Crestron Mercury®, available from Crestron Electronics, Inc. Of Rockleigh, N.J. Conferencing device 700 is shown displaying QR-Code 701, and comprises a LIDAR readable three-dimensional object region 703 disposed behind bezel cover 702. Conferencing device 700 may include a 7" (178 mm) HD color touch screen, Active Directory® authentication, Room scheduling integration with Microsoft® Exchange or Crestron Fusion®, Built-in PinPoint™ beacon for use with the Crestron PinPoint App, a Built-in PIR occupancy detector for persistent occupancy awareness combining motion and voice detection, be configurable using a web browser, include Dual LAN ports, be powered via PoE+ or AC line powered, and include CEC, IP, IR, or RS-232 display control.

Figure 8:
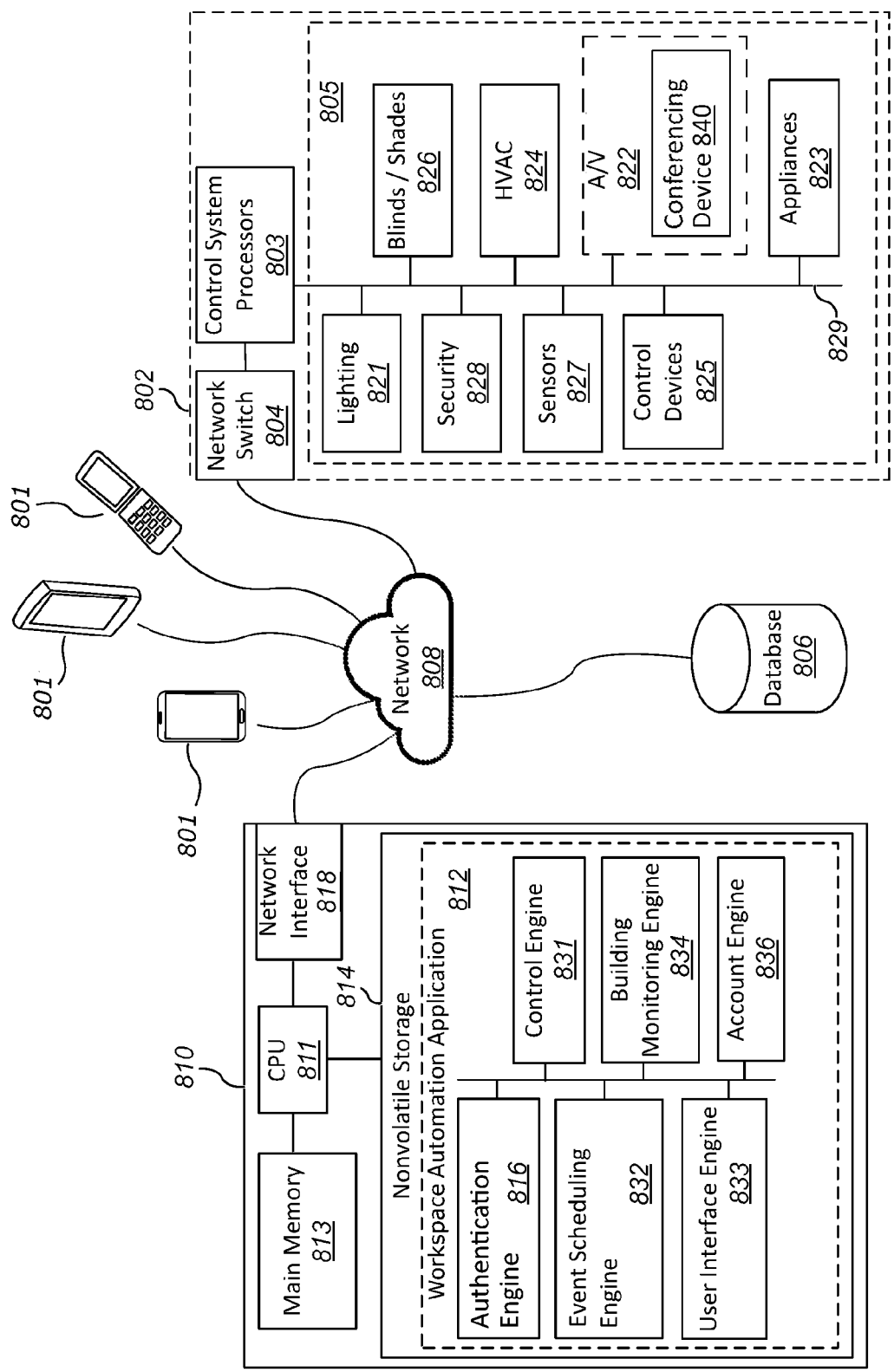
FIG. 8 illustrates a block diagram depicting a workspace management system, according to an embodiment.

FIG. 8 illustrates a block diagram depicting a workspace management system for controlling and managing one or more workspaces, such as workspace 802, according to an embodiment. It should be noted that the exemplary embodiment of workspace management system illustrated in FIG. 8 may be varied in one or more aspects without departing from the spirit and scope of the teachings disclosed herein. Workspace management system may comprise one or more mobile user device 801, remote cloud server 810, a database 806, a cloud network 808, and various devices installed in the workspace 802 such as Control System Processor 803 and electronic devices 805.

According to an embodiment, the present embodiments deliver workspace management via cloud computing on remote cloud server 810. The remote cloud server 810 may comprise or be associated with a workspace automation application 812 configured for providing a user interface on the mobile user device 801 with which the user can interact with the workspace management system. By leveraging remote access to the Control System Processor 803 and/or the controllable electronic devices 805 via remote cloud server 810, a user may monitor and control the devices 805 and/or environment settings in a workspace 802 using any mobile user device 801. The workspace automation application 812 provides a user interface on the mobile user device 801 in communication with the remote cloud server 810 allowing a user to setup scheduled events to control electronic devices 805 within the workspace 802. However, according to another embodiment, the workspace automation application 812 may alternatively reside on a control system processor 803.

Mobile user device 801 may access the services provided by the remote cloud server 810 using a web-browser such as Internet Explorer, Microsoft Edge, Firefox, Google Chrome, Opera, Safari, or the like. While the embodiments are described herein as accessing remote cloud server 810 via a web-browser, the present embodiments are not limited to such an implementation. According to other embodiments, the mobile user device 801 may comprise a proprietary native mobile app, or other similar software application, configured for accessing remote cloud server 810 via the cloud network 808. Mobile user device 801 may be any mobile user devices known in the art, including, but not limited to a laptop, a portable electronic device, a mobile computer, a smartphone, a tablet, a personal digital assistant, or any other computer configured for communicating with a remove server, such as remote cloud server 810, via a cloud network through a web-browser or other similar application. Each mobile user device 801 may comprise a central processing unit (CPU), a user interface, one of numerous forms of storage (e.g., solid-state memory (RAM, ROM, and the like), and a wireless network interface such as an interface to a wireless LAN, Wi-Fi, 802.11x wireless network, cellular data network (such as the EDGE, LTE, 3G, 4G, or 5G network.) Using its wireless network interface, each mobile user device 801 can communicate with remote cloud server 810 via the cloud network 808.

Cloud network 808 can incorporate one or more of the Internet, a wide area network (WAN), a local area network (LAN), a personal area network (PAN), a wireless network, a campus area network (CAN), a metropolitan area network (MAN), or the like. Cloud network 808 may include a public switched telephone network (PSTN), a cable telephony network, an Internet Protocol (IP) telephony network, a wireless network, a hybrid Cable/PSTN network, a hybrid IP/PSTN network, a hybrid wireless/PSTN network or any other suitable cloud network or combination of cloud networks. In addition, other network embodiments can be deployed with many variations in the number and type of devices, cloud networks, communication protocols, system topologies, and a myriad of other details without departing from the spirit and scope of the present embodiments. Cloud network 808 may include one or more gateway devices to provide with an entrance to cloud network 808, which may include software and/or hardware components to manage traffic entering and exiting cloud network 808 and conversion between the communication protocols used by various communication devices.

The workspace management system may further comprise one or more Control System Processor 803 or gateways in communication with the remote cloud server 810 via Network Switch 804 to cloud network 808. Control System Processor 803 may be connected to various electronic devices 805 throughout workspace 802 using local area network 829 via wireline or wirelessly. The Control System Processor 803 may provide a web interface for remote cloud server 810 to be displayed on a conferencing device 840 located within the workspace 802. The control system processor 803 is used for, among other things, controlling and monitoring various devices and environmental conditions throughout a structure. The control system processor 803 may, for example, be any Control System available from Crestron Electronics, Inc. Of Rockleigh, N.J. The Control System Processor 803 may comprise similar components as remote cloud server 810 as further described below. The Control System Processor 803 may further provide a time-clock function to event scheduling engine 832.

The Control System Processor 803 may control one or more of the following electronic devices: lighting devices 821, including but not limited to lamps, ballasts, light emitting diode (LED) drivers; HVAC devices 824 including but not limited to thermostats, air conditioning units, heating units, filtration systems, fans, humidifiers; shading devices 826 including but not limited to motorized window treatments, dimmable windows; sensors 827, including but not limited to occupancy sensors, proximity sensors, sound sensors, microphones, temperature sensors. AV devices 822 include, but not limited to, telephones, video phones, video touch panels, and a conferencing device 840. Examples of conferencing device 840 may include, Crestron Mercury® Tabletop UC Audio Conference Console and Crestron Flex® Phones available from Crestron Electronics, Inc. Of Rockleigh, N.J.

Security devices 828 may include, but are not limited to, security cameras, monitors, electronic safes, and door locks. Appliances 823 may include, but are not limited to, refrigerators, ovens, blenders, microwaves. Control devices 825 include, but are not limited to, switches, relays, and current limiting devices. Other types of electronic devices 805 are contemplated depending on the implementation of the workspace 802. As indicated above, according to an embodiment, one of the Control System Processor 803 may instead comprise the workspace automation application 812.

One or more network interfaces may provide connectivity between the Control System Processor 803 and electronic devices 805, and among the electronic devices 805 via the local area network 829. The network interface may represent, for example, one or more network interface cards (NIC) or a network controller. In certain embodiments, the network interface may include a PAN interface. The PAN interface may provide capabilities to network with, for example, a Bluetooth® network, an IEEE 802.15.4 (e.g. Zigbee network), or an ultra-wideband network. As should be appreciated, the networks accessed by the PAN interface may, but do not necessarily, represent low power, low bandwidth, or close-range wireless connections. The PAN interface may permit one electronic device 805 to connect to another local electronic device 805 via an ad-hoc or peer-to-peer connection. The Control System Processor 803 may directly communicate to the electronic devices 805 via the local area network 829 or may communicate using the ad-hoc or peer-to-peer communication capability of electronic device 805 to communicate with another device.

The network switch may also include a LAN interface. The LAN interface may represent an interface to a wired Ethernet-based network but may also represent an interface to a wireless LAN, such as an 802.11x wireless network. Additionally, in many cases, a connection between two electronic devices 805 via the LAN interface may involve communication through a network router or other intermediary device. Ethernet connectivity enables integration with IP-controllable devices and allows the Control System Processor 803 to be part of a larger managed network. Whether residing on a sensitive corporate LAN, a home network, or accessing the Internet through a cable modem, control system processor 803 may provide secure, reliable interconnectivity with IP-enabled devices, such as touch screens, computers, mobile user devices, video displays, Blu-ray Disc® players, media servers, security systems, lighting, HVAC, and other equipment-both locally and globally. For some embodiments, the network interfaces may include the capability to connect directly to a WAN via a WAN interface. The WAN interface may permit connection to a cellular data network, such as the EDGE, LTE, 3G, 4G, or 5G network.

The Control System Processor 803 and electronic devices 805 may also include one or more wired input/output (I/O) interface for a wired connection between one electronic device and another electronic device. One or more wired interfaces may represent a serial port, for example a communication (COM) port or a universal serial bus (USB) port. Additionally, the wired I/O interface may represent, for example, a Cresnet® port. Cresnet® connectivity provides a network wiring solution for Crestron keypads, lighting controls, thermostats, and other devices that don't require the higher speeds of Ethernet. The Cresnet® bus offers wiring and configuration, carrying bidirectional communication and 24 VDC power to each device over a simple 4-conductor cable.

One or more infrared (IR) interfaces may enable the Control System Processor 803 and electronic devices 805 to receive and/or transmit signals with infrared light. The IR interface may comply with the Infrared Data Association (IrDA) specification for data transmission. Alternatively, the IR interface may function to receive control signals or to output control signals. The IR interface may provide a direct connection with one or more devices such as a centralized AV sources, video displays, and other devices. One or more programmable relay ports may enable the Control System Processor 803 and/or electronic devices 805, such as control devices 825, to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

According to an alternative embodiment, workspace management system may operate without the utilization of Control System Processor 803. Electronic devices 805 dispersed throughout the workspace 802 may operate as a network of devices in communication with the remote cloud server 810 over cloud network 808. According to some aspects of the embodiments, each controllable electronic device 805 may comprise a Power over Ethernet (POE) interface for receiving electric power as well as for sending and receiving signals over an Internet Protocol (IP) based network.

According to an alternative embodiment, the conferencing device 840 replaces control system processor 803 in workspace 802. In these embodiments, conferencing device 840 is configured to perform the functions of control system processor 803.

Remote cloud server 810 may be used to aggregate multiple Control System Processor 803 into a centralized a workspace management system. The remote cloud server 810 may provide similar functions as the Control System Processor 803 for remote control and also comprise additional services. Remote cloud server 810 may be a dedicated, private server, employing standard security protocols.

In one embodiment, mobile user device 801 can located and communicate with remote cloud server 810 over cloud network 808 using a Uniform Resource Locator (URL) decoded from a QR-Code that mobile user device 801 captures from the display screen of conferencing device 840 using the camera installed in mobile user device 801. In one embodiment, the QR-Code is encoded with a tokenized URL that points to a link for downloading an application from the mobile user device 801 authorized application store (i.e., "App store.")

Remote cloud server 810 may be incorporated into a standalone server, although in other embodiments, the function of remote cloud server 810 may be distributed across multiple computing systems and architectures. Multiple, redundant servers may be provided for additional backup and security. For example, remote cloud server 810 may include separate web, app, or email servers.

Remote cloud server 810 may comprise one or more network interface 818 to provide connectivity with, among other things, mobile user devices 801, databases 806, Control System Processor 803 and/or electronic devices 805. The network interface 818 may represent, for example, one or more network interface cards (NIC) or a network controller. According to an embodiment, the network interface 818 includes the capability to connect directly to a wide area network (WAN). The network interface 818 may permit a connection to a cellular data network, such as EDGE, LTE, 3G, 4G, or 5G networks.

Remote cloud server 810 may include a CPU 811 configured for providing processing capability to execute an operating system, run various applications, and/or provide processing for one or more of the techniques described herein. For example, the CPU 811 may represent one or more microprocessors, and the microprocessors may be "general purpose" microprocessors, a combination of general and special purpose microprocessors, or application specific integrated circuits (ASICs). Additionally or alternatively, the CPU 811 may include one or more reduced instruction set (RISC) processors, video processors, or related chip sets.

Remote cloud server 810 may further include any one of numerous forms of storage, including main memory 813 and nonvolatile storage 814. Main memory 813 may be communicably coupled to the CPU 811 and may store data and executable code. The main memory 813 may represent volatile memory such as random access memory (RAM), but may also include nonvolatile memory, such as read-only memory (ROM) or Flash memory. In buffering or caching data related to operations of the (Central Processing Unit) CPU 811, the main memory 813 may store data associated with various engines and modules running on the remote cloud server 810. The nonvolatile storage 814 may represent any suitable nonvolatile storage medium, such as a hard disk drive or nonvolatile memory, such as Flash memory. Being well-suited to long-term storage, the nonvolatile storage 814 may store data files such as media (e.g., music and video files), software (e.g., for implementing functions on the remote cloud server 810), and building model data files, among other types of data.

Nonvolatile storage 814 may further include a workspace automation application 812 operable to enable the control and monitoring of electronic devices 805 of the building automation system, as well as perform other operations discussed below. Workspace automation application 812 may comprise a plurality of software engines. Software engines receive, transmit, and process information received from mobile user device 801, database 806, Control System Processor 803, and/or electronic devices 805. Depending upon implementation, various aspects of teachings of the present embodiments may be implemented in a single workspace automation application, a plurality of applications, a single software engine, in a plurality of software engines, in one or more hardwired components or in a combination of hardwired and software systems. In an embodiment, nonvolatile storage 814 comprises authentication engine 816. Authentication engine 816 is operably associated with the main memory 813 and CPU 811. Authentication engine 816 of nonvolatile storage 814 may be leveraged to provide authentication functions for access control for users of mobile user device 801. Authentication engine 816, or portions thereof, may also be utilized to store the data and logic steps needed to carry out authentication of a user using mobile user device 801.

The workspace automation application 812 may be run on the remote cloud server 810 and may comprise a web application-a client-server software application which runs in a web-browser of a client, such as one or more mobile user device 801. In another embodiment, mobile user device 801 comprises a proprietary native mobile app in communication with workspace automation application 812 running on remote cloud server 810. In yet another embodiment, the workspace automation application 812 may be run on one of the Control System Processor 803. The number and types of applications, software engines, and data storage areas may be varied and, as such, the specific arrangement discussed herein is presented primarily for descriptive purposes.

Workspace automation application 812 may comprise an event scheduling engine 832. The event scheduling engine 832 may be configured for allowing a user to preprogram setting user profiles, presents, scenes, building rules, and schedule of event of electronic devices 805 of the workspace automation system, as will be further described below. In other embodiments, control engine 831 is configured for transmitting preprogrammed control commands generated by the event scheduling engine 832.

According to the aspects of the present embodiments, Control System Processor 803 and/or electronic devices 805 communicate with the remote cloud server 810 to receive various control commands. To that end, software engines of remote cloud server 810 may comprise a control engine 831 configured to send at least one command to control the electronic devices 805. Control commands may comprise on-demand commands generated from mobile user device 801. For example, the at least one command may include a command to power on/off or dim a lighting device, control a touch panel, raise/lower the shades, power on/off or adjust the temperature of an HVAC system, enable/disable a security system, power on/off a sensor, power on/off a local computer, or the like. Depending upon implementation, other control commands are contemplated by the present embodiments. In other embodiments, control engine 831 is configured for transmitting preprogrammed control commands generated by the event scheduling engine 832. For example, a scheduled event may generate control commands to turn lights off in the workspace 802 during the end of business hours.

Additionally, Control System Processor 803 may transmit status information of electronic devices 805 of workspace 802. Remote cloud server 810 can comprise a Building monitoring engine 834 configured for monitoring the operation of the workspace 802 and providing this information on a mobile user device 801. Building monitoring engine 834 may be employed to provide real-time or live status information of resources of the building, such as environmental resources and conference room devices. As such, status information may be transmitted to the Building monitoring engine 834 on-demand.

Additionally, status information may be collected and stored on the database 806. The database 806 can be co-located with the remote cloud server 810, or it can be located remotely in among different systems and locations. According to an alternative embodiment, nonvolatile storage 814 further comprises Database 806. Database 806 may include any one of numerous forms of storage devices and storage media, such as solid-state memory, magnetic memory, such as disc drives, and the like, and/or optical memory, such as DVD. Building monitoring engine 834 of remote cloud server 810 may be configured to recall historic status information stored in the database 806.

In addition, nonvolatile storage 814 may comprise an Account engine 836. Remote cloud server 810 may be utilized to provide workspace automation and management services to a plurality of workspaces. In one embodiment, one or more workspaces, such as workspace 802, may be associated with an account. In another embodiment, one or more users may be associated with an account. In yet another embodiment, one or more mobile user device 801 may be associated with an account. Account engine 836 may be configured to create such accounts and correlate data relevant to a particular workspace, such as workspace 802, in these accounts, including system status information of a workspace 802, as well as other data related to workspace 802. Account engine 836 may request a variety of data from a user during a registration process. For example, requests for data may include the workspace location, list of users who are permitted to access the workspace management system of workspace 802, and their names and passwords for registration purposes.

Nonvolatile storage 814 may further comprise authentication engine 816. Authentication engine 816 can verify various types of inputs, including biometrics, information about a 3D objects or scenes, authentication tokens, transactions, and out-of-band authentication requests. In one embodiment, authentication engine 816 can analyze and recognize objects from the 3D data captured by the LIDAR camera of mobile user device 801. In another embodiment, authentication engine 816 can analyze and recognize the topology of a scene at workspace 802. In an embodiment, authentication engine 816 can generate authentication challenges, such as one time PIN codes used for authentication.

In one embodiment, authentication engine 816 can include provisions for generating a token, encoding it into a QR-Code, transmitting it for display on a display screen of conferencing device 840, receiving the decoded token back from mobile user device 801, and after verifying the token selectively controlling the visibility of a three-dimensional authentication object embedded in conferencing device 840. The mobile user device 801 would then be able to scan the three-dimensional authentication object and transmit it to authentication engine 816 for analysis and verification. As describe above, all or a portion of conferencing device 840 device bezel cover is designed to selectively conceal a LIDAR readable three-dimensional object by varying its opacity employing electrochromic, photochromic, thermochromic, suspended particle, micro-blind, liquid crystal device, or the like.

In one implementation, authentication engine 816 can ascertain that the authenticated user is given access to all resources the user is approved for. Thus, one function of this process can be linking with account engine 836 to coordinate the username and password credentialing process at conferencing device 840. In one embodiment, this linking can trigger the three-dimensional authentication object authentication workflow described above, in which the user identity is verified and his/her account is accessed.

Account engine 836 may be further configured for providing user authentication to allow access to a particular account and workspace by checking the access of a user by maintaining a database listing access permissions for resources and users as identified by user IDs and passwords, for example.

Nonvolatile storage 81 may also include a user interface engine 833. The user interface engine 833 may be leveraged in association with one or more included software engines and data available in data storage areas to enable visual layout and presentation structure of the building management services provided by remote cloud server 810. User interface engine 833 may be configured to present the visual layout on mobile user device 801.

In one embodiment, the event scheduling engine 832 of the workspace automation application 812 may comprise "Room Categories", "Room States", "Day Types", "Day Patterns", and "Calendar". Workspace automation application 812 may be run on the remote cloud server 810 or rendered on mobile user device 801 as a client-server software application.

In another embodiment, the control system processor 803 may comprise similar configuration as remote cloud server 810 and the workspace automation application 812 may be run on a control system processor 803 as an embedded web server which exposes a web interface. The functionality of the workspace automation application 812 may be exposed via a webpage from the device itself. In one embodiment, the users of the system will scan a QR-Code embedded URL and authentication token in order to log into the webpage and thereby be exposed to all functionality allowed by the control system processor 803.

Workspace 802 may comprise many rooms or workspace nodes each identifying a space or a room located within workspace 802. The nodes may be stored on database 806 and accessed by the remote cloud server 810. Although the present description hereafter describes the room nodes as being recalled from database 806 by remote cloud server 810, the present embodiments are not limited thereto. In another embodiment, the room nodes may be stored on a memory of a control system processor 803.

These room nodes may be organized in the memory in a tree topology, with the building as the root, floors as children, and individual spaces as sub-children. Each room node may be associated with one or more electronic devices 805 installed within the workspace 802. This can be accomplished by first performing a discovery process by discovering all the electronic devices 805 connected to the local area network 829 within the workspace 802. The remote cloud server 810 may communicate to the Control System Processor 803 to discover electronic devices 805 connected to the local area network 829. In another embodiment, remote cloud server 810 can communicate directly with electronic devices 805 via cloud network 808 and local area network 829 if, for example, these devices are in direct communication with the remote cloud server 810 without the use of Control System Processor 803. The discovery process may provide a list of electronic devices 805. Each electronic device 805 may be identified by a unique ID, such as the device's serial number, as well as a model number, device name, device type, or the like. Each such electronic device 805 is associated with a room node. For example, all electronic devices 805 located within a conference room may be associated with a conference room node. This association allows for monitoring and controlling the workspace 802 space by space. This association may be stored in database 806.

Using the workspace automation application 812, system user can classify these room nodes of workspace 802 by room type or "Room Categories," i.e., what the room or space is being used for. This categorization allows all rooms or spaces falling under a specific category to operate in the same way without the need to create separate events for each room. For example, a single scheduling event may be created to turn the lights off in all rooms falling under a "conference room" category at the end of a business day. Room categories may include lobby, hallways, staircases, common areas, conference rooms, private offices, open offices, bathrooms, etc., in workspace 802, or kitchen, living room, bedrooms, bathrooms, etc., in a residential building. The "Room Categories" may comprise default room categories stored in a memory, or can comprise "Room Categories" generated or edited by a user. Room classification by room categories may be changed by the user at any time when the utilization of the space changes.

In addition, implementations of the present disclosure can make use of any of the features, systems, components, devices, and methods described in The detailed examples of systems, devices, and techniques described in connection with FIGS. are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims, and their equivalents, in which all terms are meant in their broadest reasonable sense unless otherwise indicated.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of matching biometric snapshots to the first user identity, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A workspace management system comprising:
  a mobile user device having a first side and a second side, the mobile user device having
    a first wireless communication interface communicatively coupled to a cloud network,
    an optical imaging camera positioned on the first side of said mobile user device,
    a first light detection and ranging (LIDAR) camera disposed on the first side, and
    a display screen disposed on said second side of said mobile user device;
  a conferencing device having an outer enclosure, the conferencing device including
    a display screen housed withing said outer enclosure,
    a bezel cover that forms a part of the outer enclosure and covers said display screen, wherein said bezel cover includes an electrochromatic region that is transparent when electrically energized and said electrochromatic region is opaque when de-energized;
    a three-dimensional object encoded with a symbology for representing data in the x-direction, y-direction, and z-direction, said three-dimensional object disposed behind said electrochromatic region of said bezel cover and inside the interior of said enclosure; and
  a remote cloud server having a network interface communicatively coupled to said remote cloud server, the remote cloud server having CPU and a nonvolatile storage wherein said nonvolatile storage tangibly embodies instructions executable by said central processing unit for generating an authentication token to be shown on the display screen portion of said conferencing device, encoding said authentication token in a QR-Code for display on said display screen, transmitting said authentication token to said conferencing device, authenticating said authentication token after it is received from said mobile user device, transmitting instructions to said bezel cover of said conferencing device to energize said electrochromatic region, and authenticating information received from said mobile user device containing data from a capture by said first LIDAR camera of said three-dimensional object.

2. The workspace management system of claim 1, wherein said a bezel cover is transparent to the frequency of the light used by said first LIDAR camera.

3. The workspace management system of claim 1, wherein said network interface includes the capability to connect directly to a cellular data network.

4. The workspace management system of claim 1, wherein said QR-Code is encoded with a tokenized URL that points to a link for downloading an application on to said mobile user device.

5. The workspace management system of claim 1, wherein said conferencing device is located withing a workspace, said workspace comprising:
  a Control System Processor;
  one or more electronic devices; and
  a local area network for communication between the one or more electronic devices, the control processor, and conferencing device.

6. The workspace management system of claim 5, wherein said Control System Processor provides a web interface for said remote cloud server to be displayed on said conferencing device.

7. The workspace management system of claim 5, wherein said remote cloud server further comprises includes a workspace automation application having an event scheduling engine configured to allow a user to preprogram user profiles, presents, scenes, building rules, and schedule of event of said electronic devices the workspace; and
  a network switch communicatively connected to a cloud network and said local area.

8. The workspace management system of claim 7, wherein said remote cloud server further comprises a control engine configured to send at least one command to control the electronic devices, said command being one of a command to power on/off or dim a lighting device, control a touch panel, raise a shades, lower a shade, adjust the temperature setpoint of an HVAC system, disable a security system, and toggle the power of a sensor.

* * * * *